(12) United States Patent
Sandberg

(10) Patent No.: US 8,963,954 B2
(45) Date of Patent: Feb. 24, 2015

(54) METHODS, APPARATUSES AND COMPUTER PROGRAM PRODUCTS FOR PROVIDING A CONSTANT LEVEL OF INFORMATION IN AUGMENTED REALITY

(75) Inventor: Jesper Sandberg, Valby (DK)

(73) Assignee: Nokia Corporation, Espoo (FI)

( * ) Notice: Subject to any disclaimer, the term of this patent is extended or adjusted under 35 U.S.C. 154(b) by 758 days.

(21) Appl. No.: 12/827,404

(22) Filed: Jun. 30, 2010

(65) Prior Publication Data
US 2012/0001938 A1 Jan. 5, 2012

(51) Int. Cl.
| | | |
|---|---|---|
| G09G 5/00 | (2006.01) |
| H04W 4/02 | (2009.01) |
| G01C 21/36 | (2006.01) |
| G06T 19/00 | (2011.01) |
| H04L 29/06 | (2006.01) |
| H04W 4/20 | (2009.01) |

(52) U.S. Cl.
CPC ............ *H04W 4/022* (2013.01); *G01C 21/3682* (2013.01); *G01C 21/3679* (2013.01); *G06T 19/006* (2013.01); *H04L 67/38* (2013.01); *H04W 4/206* (2013.01)
USPC ............ 345/633; 345/632; 345/634; 345/419; 345/420; 345/421; 345/427; 348/113; 348/116; 348/333.02

(58) Field of Classification Search
CPC ............. G06T 19/006; G01C 21/3679; G01C 21/3682
USPC .......... 345/419–427, 632–634; 348/113–116, 348/333.02
See application file for complete search history.

(56) References Cited

U.S. PATENT DOCUMENTS

| 6,219,045 B1 | 4/2001 | Leahy et al. |
| 6,222,583 B1 * | 4/2001 | Matsumura et al. .......... 348/113 |
| 6,301,579 B1 | 10/2001 | Becker |

(Continued)

FOREIGN PATENT DOCUMENTS

| EP | 1 847 963 A1 | 10/2007 |
| EP | 2228625 A2 | 9/2010 |
| JP | 2004-239650 A | 8/2004 |
| JP | 2010-210257 A | 9/2010 |
| WO | WO 02/33688 A2 | 4/2002 |

OTHER PUBLICATIONS

International Search Report and Written Opinion mailed Jun. 20, 2011 of related international application No. PCT/FI2011/050119.

(Continued)

*Primary Examiner* — Jin-Cheng Wang
(74) *Attorney, Agent, or Firm* — Alston & Bird LLP

(57) ABSTRACT

An apparatus for providing a constant level of information in an augmented reality environment may include a processor and memory storing executable computer program code that cause the apparatus to at least perform operations including determining a first number of points of interest associated with a first set of real world objects of a current location(s). The first set of real world objects is currently displayed. The computer program code may further cause the apparatus to determine whether the first number is below a predetermined threshold and may increase a view range of a device to display a second set of real world objects. The view range may be increased in order to increase the first number to a second number of points of interest that corresponds to the threshold, based on determining that the first number is below the threshold. Corresponding methods and computer program products are also provided.

20 Claims, 8 Drawing Sheets

(56) References Cited

U.S. PATENT DOCUMENTS

| | | | |
|---|---|---|---|
| 7,379,077 | B2 | 5/2008 | Bani-Hashemi et al. |
| 7,720,436 | B2* | 5/2010 | Hamynen et al. ............ 455/13.1 |
| 2002/0044152 | A1 | 4/2002 | Abbott, III et al. |
| 2003/0001890 | A1 | 1/2003 | Brin |
| 2004/0243307 | A1* | 12/2004 | Geelen .......................... 701/213 |
| 2005/0216558 | A1 | 9/2005 | Flesch et al. |
| 2007/0162942 | A1 | 7/2007 | Hamynen et al. |
| 2008/0122834 | A1* | 5/2008 | Ouzana .......................... 345/419 |
| 2008/0268826 | A1* | 10/2008 | Nelson .......................... 455/416 |
| 2010/0149399 | A1* | 6/2010 | Mukai et al. ............. 348/333.02 |
| 2010/0225756 | A1* | 9/2010 | Miyata .......................... 348/116 |
| 2010/0228612 | A1* | 9/2010 | Khosravy et al. ............ 705/14.4 |
| 2010/0280747 | A1* | 11/2010 | Achthoven .................... 701/200 |
| 2011/0199479 | A1* | 8/2011 | Waldman ...................... 348/116 |
| 2011/0317877 | A1* | 12/2011 | Bell .............................. 382/103 |

OTHER PUBLICATIONS

Bell et al., "View Management for Virtual and Augmented Reality," http://graphics.cs.columbia.edu/projects/ViewManagement/index.html, Mar. 30, 2004.

Julier et al., "Information Filtering for mobile Augmented Reality", http://citeseerx.ist.psu.edu/viewdoc/download?doi=10.1.158.5115&rep=rep1&type=pdf, Proc. ISAR '00, Munich, Germany, Oct. 5-6, 2000, pp. 3-11.

Japan Patent Office, Office Action for Application No. 2013-517418, Dec. 19, 2014, 16 pages, Japan.

Kurata, Takeshi, et al., "Perspective 3 : AR Interface(<Special Feature>Augmented Reality)", *IPSJ Magazine*, Apr. 15, 2010, pp. 425-430, 51(4), Information Processing Society of Japan (IPSJ), Japan.

* cited by examiner

US 8,963,954 B2

METHODS, APPARATUSES AND COMPUTER PROGRAM PRODUCTS FOR PROVIDING A CONSTANT LEVEL OF INFORMATION IN AUGMENTED REALITY

TECHNOLOGICAL FIELD

An example embodiment of the invention relates generally to user interface technology and, more particularly, relates to a method, apparatus, and computer program product for providing a constant level of information in an augmented reality environment.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal.

In some situations, mobile terminals may enhance the interaction that users have with their environment. Numerous use cases have developed around the concept of utilizing mobile terminals to enhance user interaction with their local area such as, for example, virtual tour guides and other mixed reality applications. Mixed reality involves the merging of real and virtual worlds. In some cases, mixed reality involves mixing real world image data with virtual objects in order to produce environments and visualizations in which physical and digital objects co-exist and potentially also interact in real time. Mixed reality includes augmented reality, which uses digital imagery to augment or add to real world imagery, and virtual reality, which simulates real world environments using computer simulation.

Augmented reality (AR) is a fast growing area, which is currently available on many mobile platforms (e.g., Symbian™, Android™, iPhone™, Windows Mobile™, etc.). The concept of augmented reality is to overlay graphics or information on a live video stream or a still image from a camera in a communication device. The graphics/information may be of any kind. In augmented reality graphics/information about the environment and objects in it can be stored and retrieved as an information layer on top of a view of the real world.

A common use of augmented reality is to overlay points of interests (POIs) on a video stream or still image. These POIs may be static information, like landmarks, for example or any information that may be geo-coded (e.g., contains a coordinate(s)). An example of the use of augmented reality can be seen in FIG. 1, where information provided by Wikipedia™ and tweets provided by Twitter™ are overlaid on a camera view of a communication device.

When a consumer presses one of the Wikipedia™ icons for example, the user may be presented with more information about an article associated with the selected icon. As an example, augmented reality may be used by consumers when they are in new places, and want to obtain information about things they see. By standing in front of a tourist attraction and pointing a camera at the attraction, the consumer can get information about the attraction.

A common problem associated with augmented reality applications is that the information that the AR applications may provide may become so crowded that it is unbeneficial and more of a disservice to the user. An example of this is shown in FIG. 2, where the information is so crowded in a camera view, that the user may not be able to utilize the information effectively.

For instance, the information may become so crowded that it may clutter the view on the camera causing the user to be unable to see the picture of the real world objects in the environment shown in the camera. When the information becomes crowded, it may also be very difficult for the user to identify which icon(s) of information belongs to a corresponding real world object(s) on the view of the camera. In this regard, some of the information on the view of the camera may not be visible, as it may be hidden behind other information. The hidden information shown on the view of the camera may actually be closer to the user in the real world environment than other information on the view of the camera that is unencumbered.

Currently, there are two approaches of conventionally dealing with the problem of cluttered displays in augmented reality. The first approach relates to allowing the user to select which information layers should be visible on the display based on the information that the user desires to see. Although this approach allows the user to completely turn on and turn off information layers, the drawback is that the user may not be able to choose within the information. For instance, even though the user is able to choose an information layer (e.g., a set of information to be provided by a service provider), the chosen information layer may still provide a large amount of information which may crowd the view of the camera.

The second approach relates to allowing consumers to select a fixed range/distance in which the user may want to see information (e.g., augmented reality information). For instance, the user may utilize a communication device to select a feature to view all augmented reality information within two kilometers of a current location. This approach has a drawback in that it may present undesirable effects in areas with less augmented reality information. For instance, there is a risk that the user selected a range/distance which is too small for any useful augmented reality information to show up on a view of the camera. For example, all or a substantial amount of the augmented reality information available for the current location may be outside of the range/distance selected by the user.

In view of the foregoing drawbacks, it may be desirable to provide an alternative mechanism by which to reduce the clutter of information provided to a communication device in an augmented reality environment.

SUMMARY

A method, apparatus and computer program product are therefore provided for automatically enabling provision of a constant level of information in augmented reality. The example embodiment may alleviate a problem associated with overcrowded or cluttered displays showing information (e.g., virtual information) in augmented reality. In this regard, the example embodiment may automatically adjust a view range or view distance of a media capturing device (e.g., a camera) that may capture one or more live images and/or video for display on a communication device.

The adjustment of the view range/distance may be performed by analyzing the density of points of interest associated with real world objects of a current location(s). The points of interest may be associated with information corresponding to locations of real world objects that may be of interest to a user. In this regard, the POIs may be associated with geo-location data (e.g., latitude, longitude, altitude coordinates of a real world object(s)) as well as any other data (e.g., text, images, video data, etc.). These POIs may be overlaid on corresponding images of real world objects on a display. The POIs may, but need not, be represented by virtual objects (e.g., graphical elements such as, for example, icons).

In an example embodiment, when a user points the media capturing device in a direction associated with a high density or large quantity of points of interest, an example embodiment may automatically decrease the view distance such the media capturing device is unable to capture as much information (e.g., images of real world objects). By decreasing the view distance to capture less information, fewer corresponding points of interests may be provided to a display. Additionally, when the user points the media capturing device to a direction associated with a low density or small quantity of points of interest, the example embodiment may increase the view range of the media capturing device to capture additional information (e.g., images of real world objects). By increasing the view distance to capture more information, more corresponding points of interests may be provided to a display.

In this regard, an example embodiment may analyze the density of the information available in a view of the media capturing device to determine how much information is available to be shown in order to adjust the view distance. For instance, instead of showing all the points of interest on a display, the example embodiment may analyze the amount of POIs that are present at a view angle of the media capturing device. In this manner, an example embodiment may set the view distance of the media capturing device to ensure that the amount of POIs for display is maintained at a constant level. By using this approach, an example embodiment may enable provision of the same amount of points of interest for display on a communication device regardless of whether a high or low density of points of interest are initially detected by the communication device.

In one exemplary embodiment, a method for providing a constant level of information in an augmented reality environment is provided. The method may include determining a first number of points of interest associated with a first set of real world objects currently being displayed. The first set of real world objects may relate to at least one current location. The method may further include determining whether the first number is below a predetermined threshold. The method may further include increasing a view range of a device to facilitate display of a second set of real world objects in order to increase the first number to a second number of points of interest that corresponds to the predetermined threshold. The first number may be increased to the second number of points of interest that corresponds to the predetermined threshold in response to determining that the first number is below the threshold. The view range may include the view at a distance and angle of the device.

In another exemplary embodiment, an apparatus for providing a constant level of information in an augmented reality environment is provided. The apparatus may include a processor and a memory including computer program code. The memory and the computer program code are configured to, with the processor, cause the apparatus to at least perform operations including determining a first number of points of interest associated with a first set of real world objects currently being displayed. The first set of real world objects may relate to at least one current location. The memory and the computer program code may further cause the apparatus to determine whether the first number is below a predetermined threshold. The memory and the computer program code may further cause the apparatus to increase a view range of a device to facilitate display of a second set of real world objects in order to increase the first number to a second number of points of interest that corresponds to the predetermined threshold. The first number may be increased to the second number of points of interest that corresponds to the predetermined threshold in response to determining that the first number is below the threshold. The view range may include the view at a distance and angle of the device.

In another exemplary embodiment, a computer program product for providing a constant level of information in an augmented reality environment is provided. The computer program product includes at least one computer-readable storage medium having computer-executable program code instructions stored therein. The computer executable program code instructions may include program code instructions for determining a first number of points of interest associated with a first set of real world objects currently being displayed. The first set of real world objects may relate to at least one current location. The program code instructions may also determine whether the first number is below a predetermined threshold. The program code instructions may also increase a view range of a device to facilitate display of a second set of real world objects in order to increase the first number to a second number of points of interest that corresponds to the predetermined threshold. The first number may be increased to the second number of points of interest that corresponds to the predetermined threshold in response to determining that the first number is below the threshold. The view range may include the view at a distance and angle of the device.

An embodiment of the invention may provide a better user experience since the user may be able to focus on the virtual information that may be overlaid on real world objects, instead of spending time changing a range/distance in order to obtain some virtual information for a current location of a device. As a result, device users may enjoy improved capabilities with respect to applications and services accessible via the device.

BRIEF DESCRIPTION OF THE SEVERAL VIEWS OF THE DRAWINGS

Figure 1:
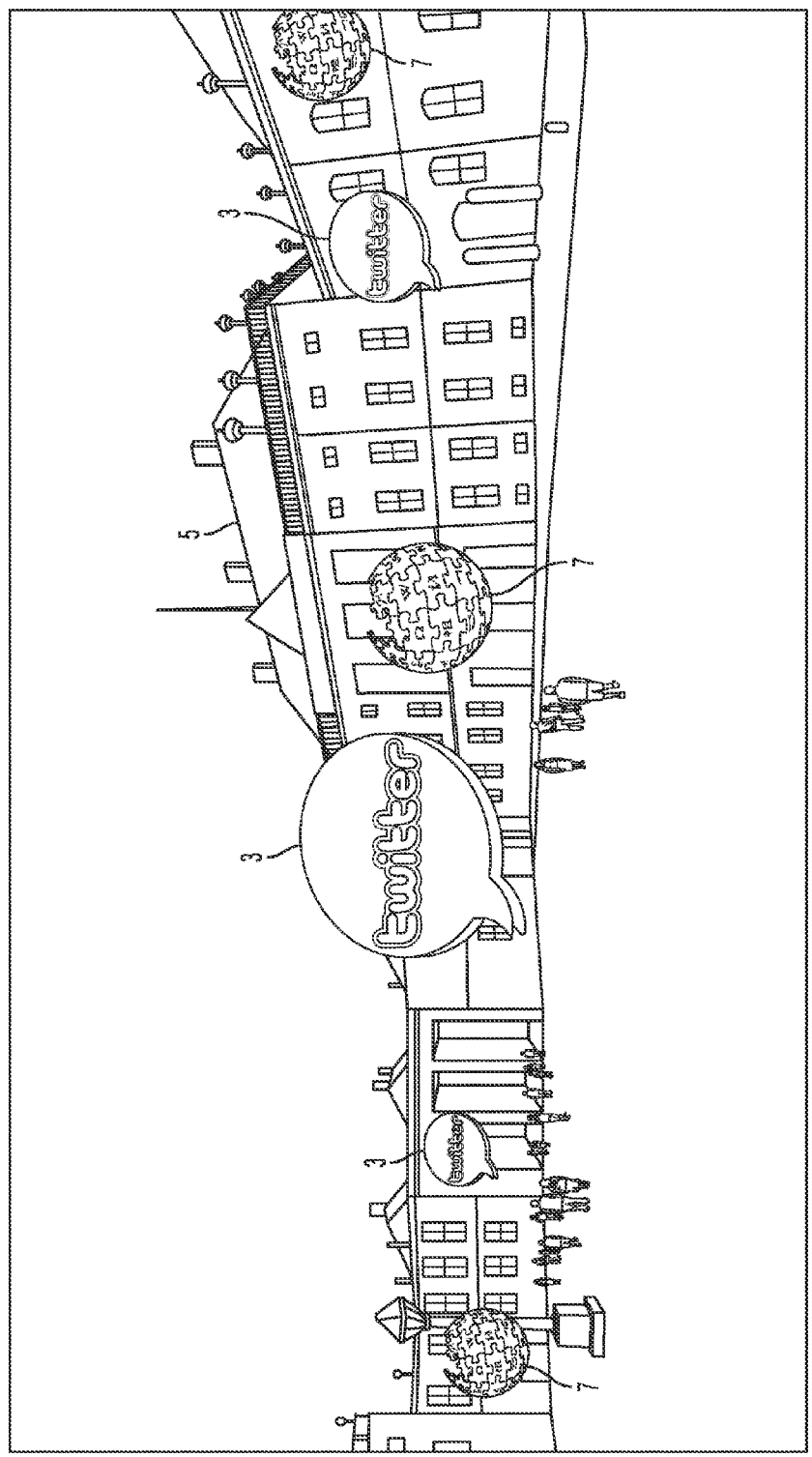
Figure 2:
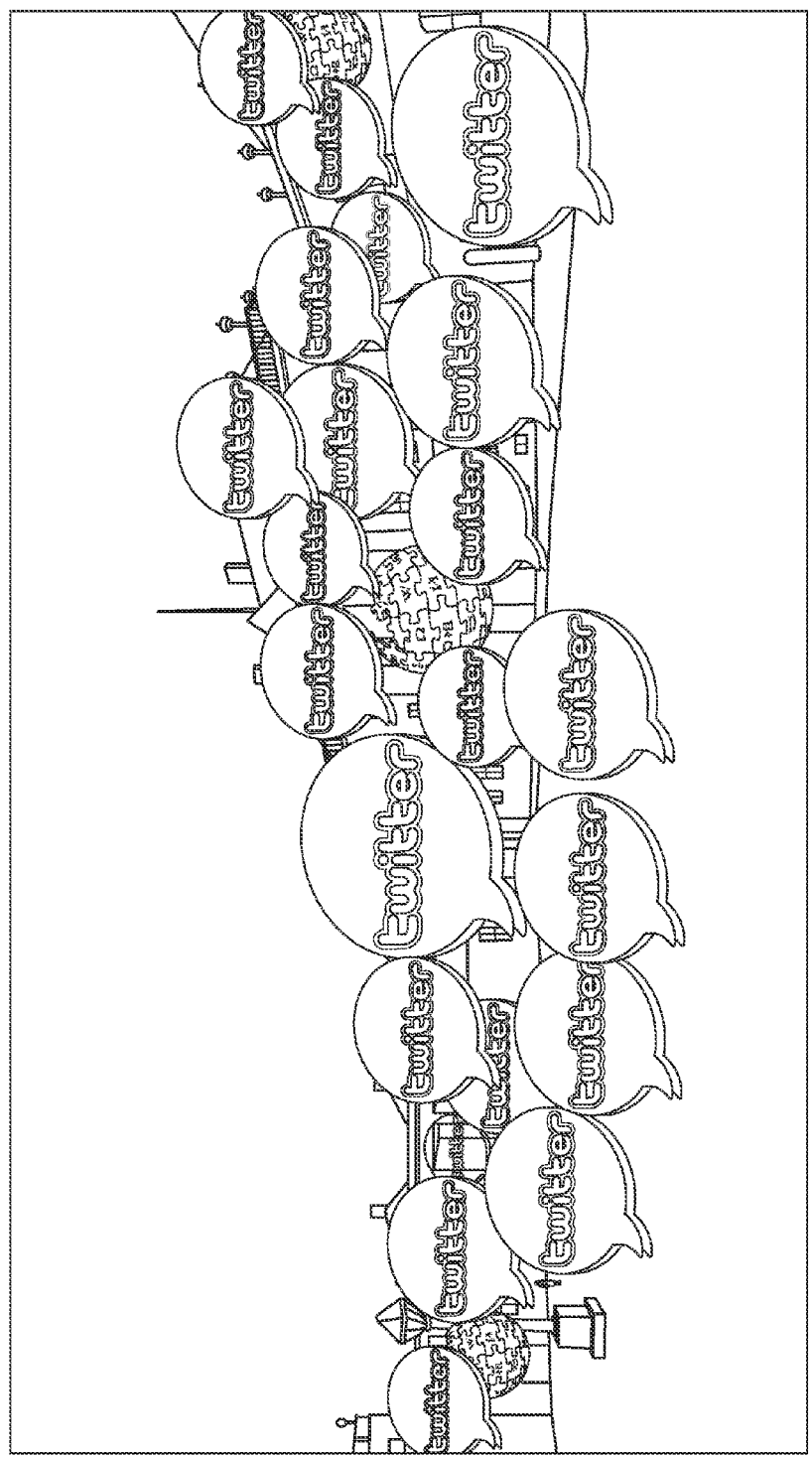
Figure 3:
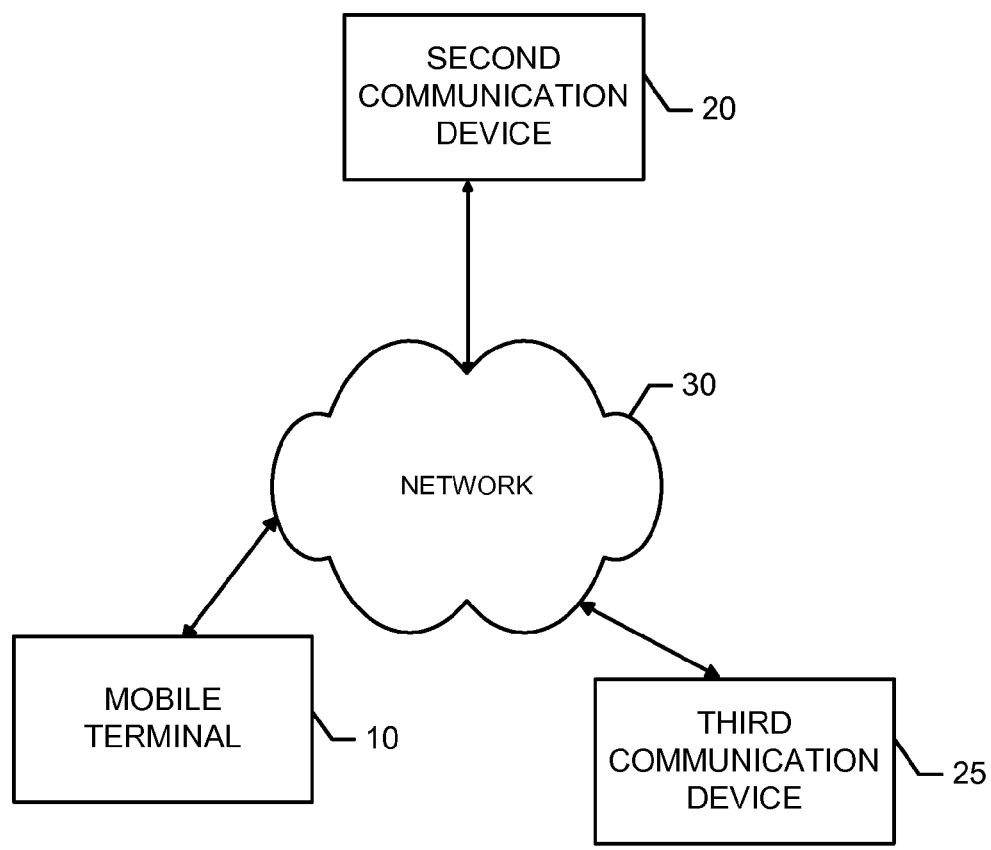
Figure 4:
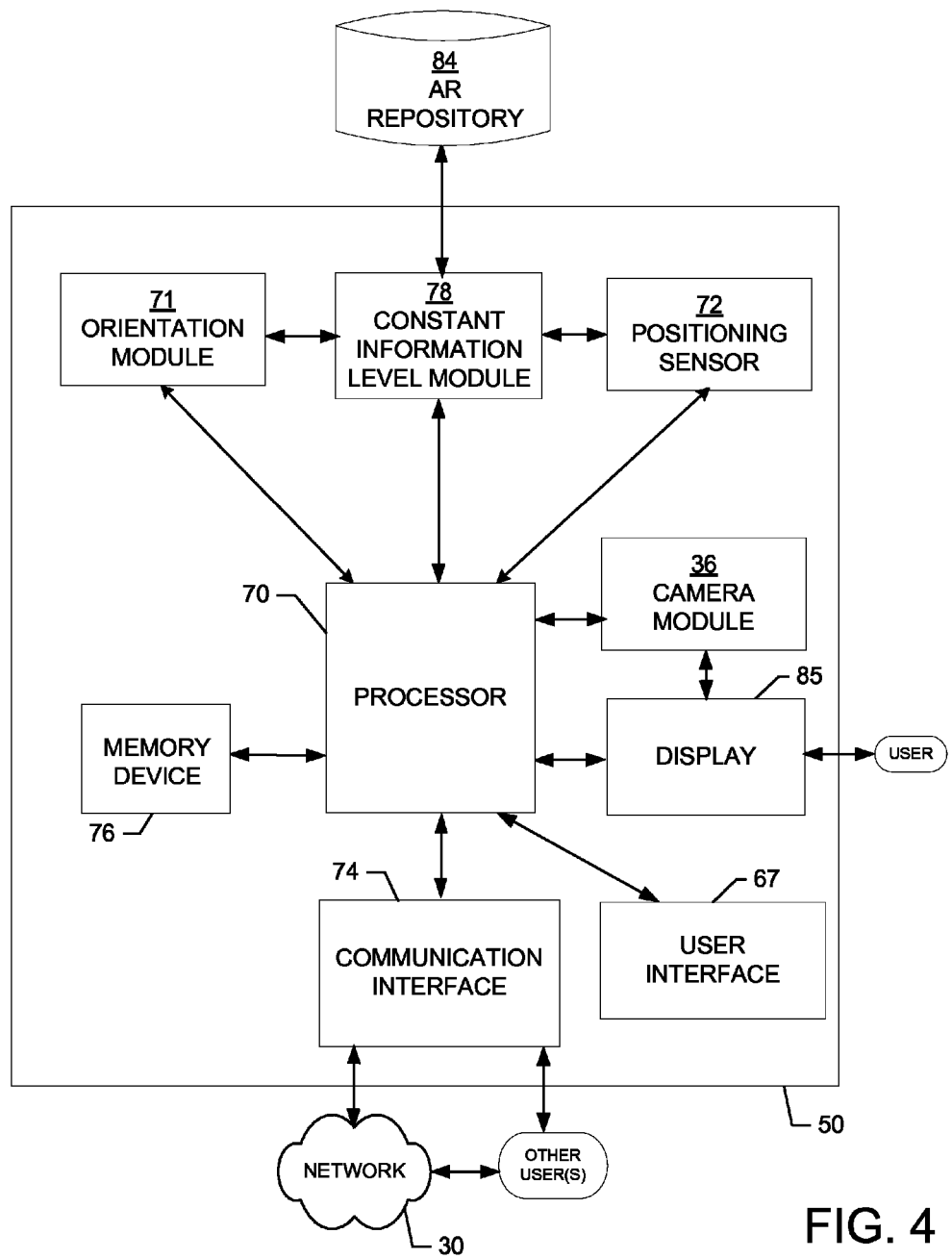
Figure 5:
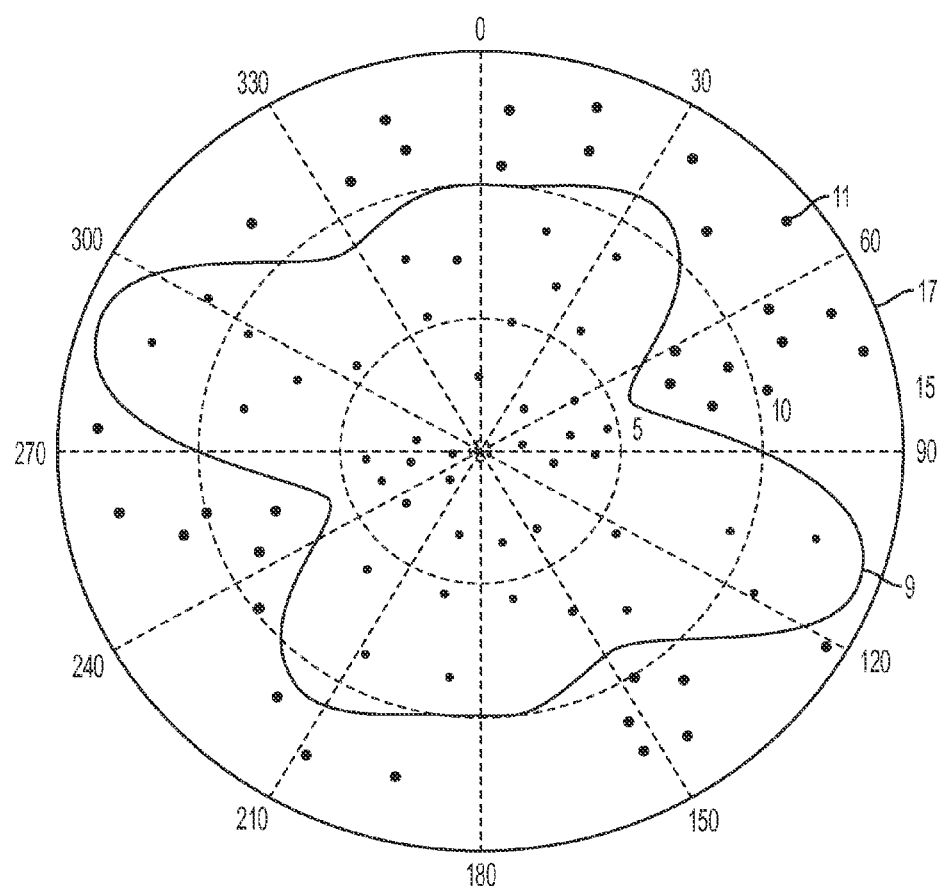
Figure 6:
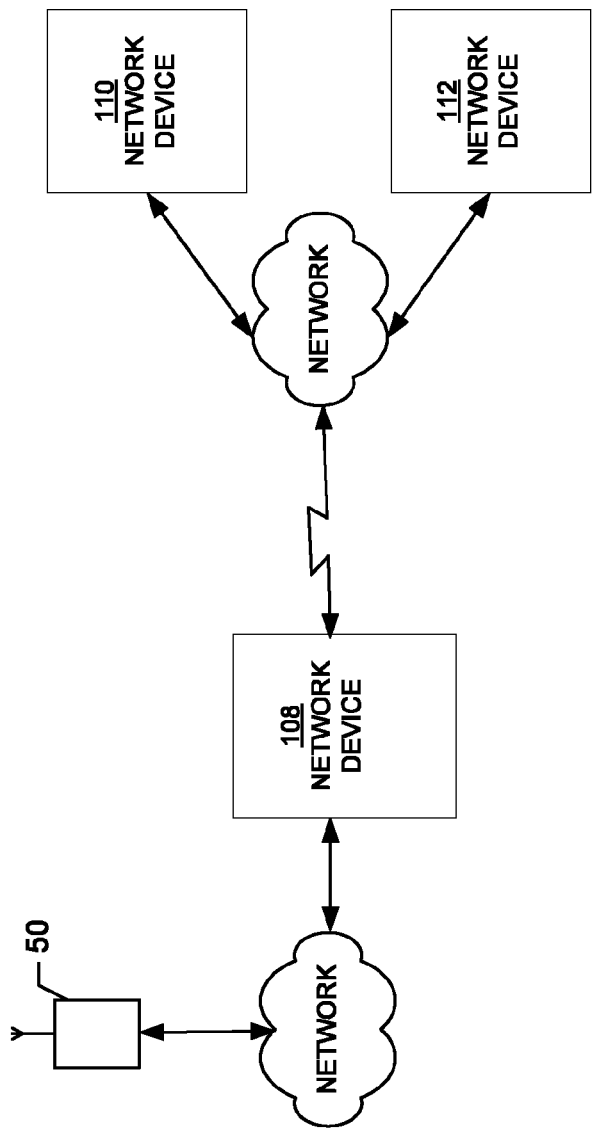
Figure 7:
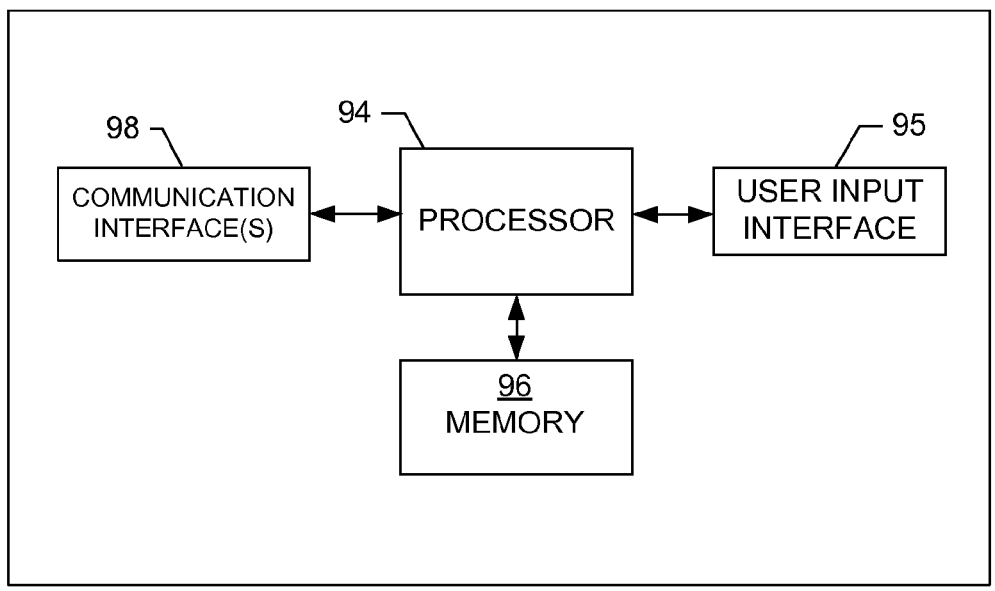
Figure 8:
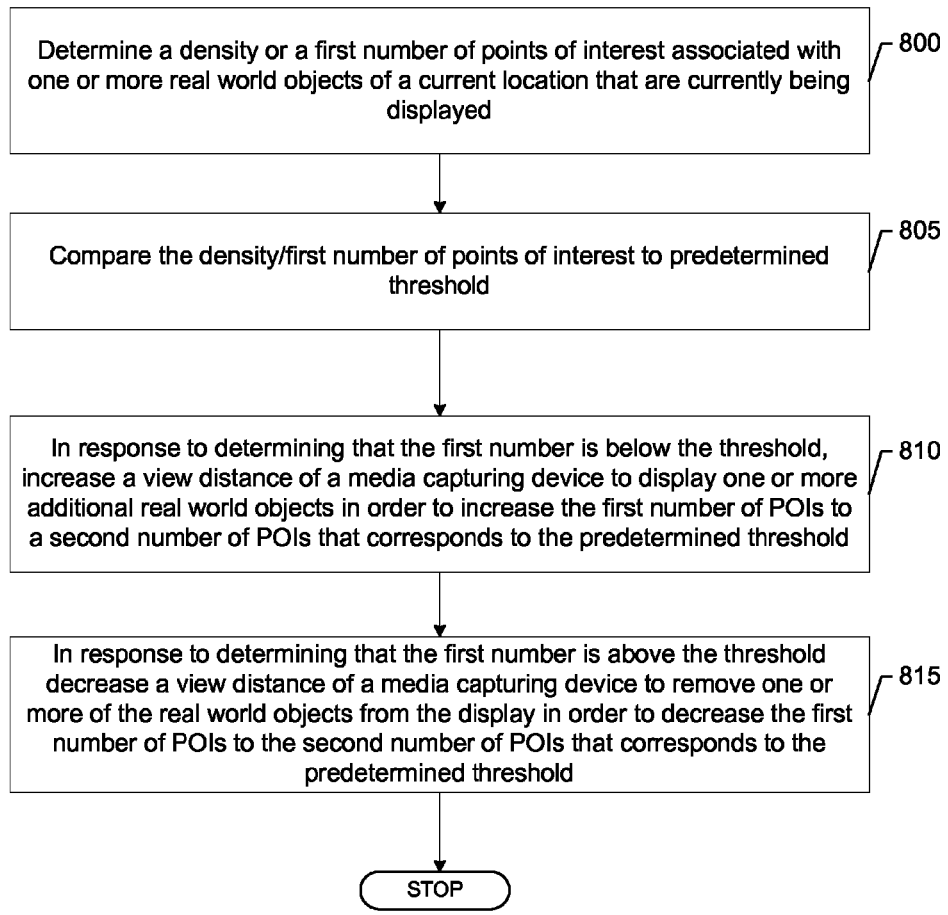

Having thus described some example embodiments of the invention in general terms, reference will now be made to the accompanying drawings, which are not necessarily drawn to scale, and wherein:

FIG. 1 is an illustration of a view of virtual information provided by an augmented reality application for a current location;

FIG. 2 is an illustration of a view of overcrowded virtual information in augmented reality for a current location;

FIG. 3 is a schematic block diagram of a system according to an example embodiment of the invention;

FIG. 4 is a schematic block diagram of an apparatus for providing a constant level of information in augmented reality according to an example embodiment of the invention;

FIG. 5 is a diagram illustrating the correlation between the view distance of a device and the distance of virtual information available for a current location according to an example embodiment of the invention;

FIG. 6 is a schematic block diagram of a system according to an example embodiment;

FIG. 7 is a schematic block diagram of a network entity according to an example embodiment of the invention; and FIG. 8 illustrates a flowchart for providing a constant level of information in augmented reality according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

Also, as used herein a "layer(s)", "information layer(s)" or "layer(s) of information" may be a layer(s) of information which may be shown on a display. The layer(s) of information may be provided by one or more content providers and may correspond to items of virtual information (e.g., virtual objects). In this regard, the layer(s) of information may, but need not, be a layer of virtual objects (e.g., graphical elements such as icons, pictograms, etc.) in which each graphical element indicates information. The information of the information layer(s) may be associated with location information such as, for example, geo-coordinates (e.g., longitude, latitude, altitude coordinates) and any other suitable data. For instance, the items of virtual information may relate to receipt of location information indicating a current location of a device or a current location(s) of real world objects currently being shown by the device. In one embodiment, a layer of information may be information that is associated in such a way as to be displayed together as part of the same overlay. Different layers may be provided by different content providers and/or may correspond to different virtual objects.

For purposes of illustration and not of limitation, a layer of information may be a layer of icons (e.g., Wikipedia™ icons) associated with information (e.g., Wikipedia™ articles) provided by a content provider (e.g., Wikipedia™ website). For example, a layer of information 7 (also referred to herein as Wikipedia™ information layer 7) provided by a content provider such as for example Wikipedia™ is shown in FIG. 1. Additionally, FIG. 1 shows a layer of information 3 (also referred to herein as Twitter™ information layer 3) provided by a content provider such as Twitter™. The layers of information 3, 7 may correspond to virtual objects (e.g., icons, etc.) associated with additional information corresponding to the geo-coordinates of the corresponding real world objects (e.g., real world object 5) of FIG. 1.

As referred to herein "view distance" or "view range" may refer a distance in which a device (e.g., camera module 36) may be able to view information (e.g., virtual information) that may be shown on a display (e.g., a camera view of a display). For purposes of illustration and not of limitation, when the view distance is set to 500 meters, then information (e.g., virtual information) located at a distance of 520 meters from an apparatus or device of a user may not be shown on the display. In contrast, information located at a distance 490 meters from the apparatus or device may be shown on the display.

As referred to herein, "constant information level", "constant level of information" or the like may be used interchangeably to refer to a manner in which to ensure that the number of information elements, items of information (e.g., icons) or POIs provided to a display is constant or remains at a constant level (e.g., a threshold of 35 information elements shown on the display at any given time). An example embodiment may achieve a constant information level by changing the view distance based in part on the amount of information present for a location. In an example embodiment, the constant information level may be a range such that the number of POIs is desirably within the range whether or not the number of POIs specifically equals some predefined value. In another example embodiment, a common information level may be reached in an instance in which a quantity of POIs is as close as the circumstances permit (e.g., there are not enough POIs for particular area of the real world environment) even if the quantity of POIs are technically unequal to a threshold.

Additionally, as used herein, the term "camera view angle" or "camera view field" may refer to an angle for a camera that may be shown on a display. As referred to herein, the terms "information point(s)", "point of interest(s)" (POI(s)), "item(s) of augmented reality (AR) information", "AR information", "virtual information", "item(s) of virtual information" and similar terms may be used interchangeably to refer to a point(s) in space (e.g., a geo-coordinate(s) such as, for e.g., longitude, latitude, altitude coordinates) which contains or is associated with some information (e.g., text, audio data, media content such as, for example, an image(s), picture(s), video data, etc.). The information point(s), POI(s), item(s) of AR information, AR information, virtual information, or item(s) of virtual information may be marked on a display by a virtual object(s) (e.g., a graphical element(s) such as an icon(s), pictogram(s), etc.).

In an example embodiment, the addition of content as an overlay, virtual removal of objects, or the replacement of certain objects with others may be accomplished by inserting virtual content (e.g., virtual object(s)) into a live image or video of a real world environment.

FIG. 3 illustrates a generic system diagram in which a device such as a mobile terminal 10 is shown in an example communication environment. As shown in FIG. 3, an embodiment of a system in accordance with an example embodiment of the invention may include a first communication device (e.g., mobile terminal 10) and a second communication device 20 capable of communication with each other via a network 30. In some cases, an embodiment of the invention may further include one or more additional communication devices, one of which is depicted in FIG. 3 as a third communication device 25. In one embodiment, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the invention.

The network 30 may include a collection of various different nodes (of which the second and third communication devices 20 and 25 may be examples), devices or functions that may be in communication with each other via corresponding wired and/or wireless interfaces. As such, the illustration of FIG. 3 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), LTE advanced (LTE-A) and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 3, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as, for example, personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an example embodiment, one or more of the devices in communication with the network 30 may employ a constant information level (CIL) module (e.g., CIL module 78 of FIG. 4). The CIL module may enable provision of a number of information elements on a display at constant level. The CIL module may maintain the information elements at a constant level in part by changing a view distance based on the amount of information present for a location.

In an example embodiment, the mobile terminal 10 and the second and third communication devices 20 and 25 may be configured to include the CIL module. However, in an alternative embodiment the mobile terminal 10 may include the CIL module and the second and third communication devices 20 and 25 may be network entities such as servers or the like that are configured to communicate with each other and/or the mobile terminal 10. For instance, in an example embodiment, the second communication device 20 may be a dedicated server (or server bank) associated with a particular information source or service (e.g., a localized augmented/virtual reality service, a mapping service, a search service, a media provision service, etc.) or the second communication device 20 may be a backend server associated with one or more other functions or services. As such, the second communication device 20 may represent a potential host for a plurality of different services or information sources. In one embodiment, the functionality of the second communication device 20 is provided by hardware and/or software components configured to operate in accordance with known techniques for the provision of information to users of communication devices. However, at least some of the functionality provided by the second communication device 20 is information provided in accordance with an example embodiment of the invention.

In an example embodiment, the second communication device 20 may host an apparatus for providing a localized augmented/virtual reality service and/or may host an provision service that provides information (e.g., text, images, videos, audio data, etc.) to a device (e.g., mobile terminal 10) practicing an embodiment of the invention. The localized augmented/virtual reality service may provide items of virtual/augmented information about an environment displayed in a camera view of a device (e.g., mobile terminal 10) and the real world objects in the environment.

The third communication device 25 may also be a server providing a number of functions or associations with various information sources and services (e.g., a localized virtual/augmented reality service, a mapping service, a search service, a media provision service, etc.). In this regard, the third communication device 25 may host an apparatus for providing virtual/augmented reality information to the second communication device 20 to enable the second communication device to provide the virtual/augmented reality information to a device (e.g., the mobile terminal 10) practicing some an embodiment of the invention. The virtual/augmented reality information provided by the third communication device 25 to the second communication device 20 may provide information about an environment displayed in a camera view of a device (e.g., mobile terminal 10) and the objects in the environment.

As such, in one embodiment, the mobile terminal 10 may itself perform an example embodiment. In another embodiment, the second and third communication devices 20 and 25 may facilitate (e.g., by the provision of augmented/virtual reality information) operation of an example embodiment at another device (e.g., the mobile terminal 10). In still another example embodiment, the second and third communication devices 20 and 25 may not be included at all.

FIG. 4 illustrates a schematic block diagram of an apparatus for automatically providing a constant level of information in augmented reality according to an example embodiment of the invention. An example embodiment of the invention will now be described with reference to FIG. 4, in which certain elements of an apparatus 50 are displayed. The apparatus 50 of FIG. 4 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 4, the apparatus 50 may include or otherwise be in communication with a processor 70, a user interface 67, a communication interface 74, a memory device 76, a display 85, an orientation module 71, a constant information level (CIL) module 78, a positioning sensor 72, a camera module 36 and an AR repository 84. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.).

The memory device 76 may store geocoded information that may be associated with location information corresponding to coordinates such as, for example, latitude, longitude and/or altitude coordinates of real-world objects. The geocoded information may be evaluated by the processor 70 and/or CIL module 78 and data associated with the geocoded information may be provided to a camera view of a display. In an example embodiment, the processor 70 and/or CIL module 78 may provide the information associated with the geocoded information to the camera view of the display, in response to determining that the location of the real-world objects shown on the camera view of the display correspond to the location information of the geocoded information.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, augmented reality (AR) browser, Web browser or the like. In this regard, the connectivity program may enable the apparatus 50 to transmit and receive Web content, such as for example location-based content or any other suitable content, according to a Wireless Application Protocol (WAP), for example. It should be pointed out that the AR browser may be a user interface that facilitates navigation of objects in a view of a physical real-world environment with information such as, for example one or more information layers that are added, augmented or altered in some fashion by providing data about the surrounding real world objects. The information layers may, but need not, be viewed as on top of the real world view. The AR browser may be utilized by the processor 70 to facilitate execution of one or more augmented reality applications. It should be pointed out that the processor 70 may also be in communication with a display 85 and may instruct the display to illustrate any suitable information, data, content (e.g., media content) or the like.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

The apparatus 50 includes a media capturing element, such as camera module 36. The camera module 36 may include a camera, video and/or audio module, in communication with the processor 70 and the display 85. The camera module 36 may be any means for capturing an image, video and/or audio for storage, display or transmission. For example, the camera module 36 may include a digital camera capable of forming a digital image file from a captured image. As such, the camera module 36 may include all hardware, such as a lens or other optical component(s), and software necessary for creating a digital image file from a captured image. Alternatively, the camera module 36 may include only the hardware needed to view an image, while a memory device (e.g., memory device 76) of the apparatus 50 stores instructions for execution by the processor 70 in the form of software necessary to create a digital image file from a captured image. In an example embodiment, the camera module 36 may further include a processing element such as a co-processor which assists the processor 70 in processing image data and an encoder and/or decoder for compressing and/or decompressing image data. The encoder and/or decoder may encode and/or decode according to a Joint Photographic Experts Group, (JPEG) standard format or another like format. In some cases, the camera module 36 may provide live image data to the display 85. In this regard, the camera module 36 may facilitate or provide a camera view to the display 85 to show live image data, still image data, video data, or any other suitable data. Moreover, in an example embodiment, the display 85 may be located on one side of the apparatus 50 and the camera module 36 may include a lens positioned on the opposite side of the apparatus 50 with respect to the display 85 to enable the camera module 36 to capture images on one side of the apparatus 50 and present a view of such images to the user positioned on the other side of the apparatus 50.

In addition, the apparatus 50 may include a positioning sensor 72. The positioning sensor 72 may include, for example, a global positioning system (GPS) sensor, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory of the apparatus 50 or to another memory device to be stored as a position history or location information.

In an example embodiment, the apparatus 50 may further include (or be in communication with) an orientation module 71. The orientation module 71 may be any means such as a device or circuitry embodied in either hardware or a combination of hardware and software that is configured to determine the orientation of apparatus 50 and/or of the field of view of the camera module 36 of the apparatus 50.

Orientation module 71 may be configured to determine the orientation of apparatus 50 relative to a reference. In some cases, the reference may be a particular direction, such as North or another cardinal direction. However, other references could also be employed. As such, in one embodiment, the orientation module 71 may include a compass or other orientation sensor configured to determine the heading of the apparatus 50 or direction that the lens of the camera module 36 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module or simply an initial orientation.

In an example embodiment, the orientation of the field of view of the camera module 36 may be compared to the reference in order to determine the current orientation of the apparatus 50. Thus, for example, given an initial image, a particular feature may be selected as the reference. Thereafter, as the field of view is altered, the orientation module 71 may be configured to determine the orientation of the field of view of the camera module 36 based on the speed or amount of movement relative to the reference. While one embodiment may only determine orientation in a single plane (e.g., parallel to the surface of the earth), another embodiment may allow for orientation determination including an elevation aspect and/or axial aspect shifts. Thus, for example, the orientation module 71 may be configured to determine pitch and/or yaw of the apparatus 50 (e.g., pitch defining a degree of elevation and yaw defining an axial rotation). As such, for example, the orientation module 71 may include a device or other means for determining the orientation of the apparatus 50 (or the field of view of the camera module 36), which may be referred to as orientation information. In one embodiment, the orientation module 71 may include an electronic compass, a horizon sensor, gravity sensor, accelerometer, gyroscope, magnetometer and/or the like or any other sensor that may be useful in determining orientation information.

In an example embodiment, the processor 70 may be embodied as, include or otherwise control the CIL module. The CIL module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the CIL module 78 as described below. Thus, in an example in which software is employed, a device or circuitry (e.g., the processor 70 in one example) executing the software forms the structure associated with such means.

In an example embodiment, the CIL module 78 may automatically adjust a distance or range in which virtual information may be shown on a camera view of display 85 when a user points the camera module 36 at a real world environment to capture a live image(s) and/or video(s). The adjustment of the distance/range may be performed by the CIL module by analyzing the amount of virtual information (e.g., virtual objects) or density provided by the information layers (e.g., virtual objects provided by different service providers (e.g., Twitter™)) for the real world objects captured by the camera module 36. In this regard, when the user of the apparatus 50 points the camera module 36 in a direction in which the CIL module determines the density or amount of virtual information exceeds a predetermined threshold (e.g., 30 points of interest), the CIL module 78 may automatically decrease the range or view distance of the camera module. Decreasing the view distance of the camera module 36 may reduce the amount of virtual information that may be shown on the camera view of the display 85 since the range of real world objects captured by the camera module 36 is reduced. In one embodiment, the CIL module 78 may cause the camera module 36 to adjust the angular span of an image captured by the camera module either with or without making changes in the view range. For example, if too many POIs exist for a geographic area, the CIL module 78 may shrink the angle and minimize the number of POIs.

In an example embodiment, the predetermined threshold may be any suitable number of items of virtual information (e.g., points of interest). When the CIL module 78 determines that the density or amount of virtual information exceeds the predetermined threshold, the CIL module 78 may reduce the view distance (e.g., 500 meters) of the camera module 36 such that the amount of items of virtual information (e.g., virtual objects) corresponding to the real world objects captured by the camera module 36 may equal the predetermined threshold (e.g., 30 points of interest).

On the other hand, when the user of the apparatus 50 points the camera module 36 to a direction in which the CIL module 78 determines that the density or amount of virtual information is below the predetermined threshold, the CIL module 78 may automatically increase the range or view distance (e.g., 550 meters) of the camera module 36. Increasing the view distance of the camera module 36 may increase the amount of virtual information that may be shown on the camera view of the display 85 since the range of real world objects captured by the camera module 36 is increased. In an example embodiment, when the CIL module 78 determines that the density or amount of virtual information is below the predetermined threshold, the CIL module 78 may increase the view distance of the camera module 36 such that the amount of items of virtual information (e.g., virtual objects) corresponding to the real world objects captured by the camera module 36 may equal the predetermined threshold (e.g., 30 points of interest). The CIL module 78 is capable of providing a constant level of virtual information to the display 85 by adjusting the view distance of the camera module 36 to enable provision of items of virtual information to equal the predetermined threshold in instances in which the items of virtual information initially exceed the predetermined threshold and in instances in which the number of items of virtual information are initially below the predetermined threshold. In this regard, the apparatus 50 may, but need not, have the same amount of information (e.g., 30 points of interest) provided to the display 85, by the CIL module 78, irrespective of the number of items of virtual information corresponding to real world objects that are initially captured by the camera module 36. In an example embodiment, there may be lower and upper limits on the adjustment to the range that is permitted by the CIL module 78 since the resulting image may end up being too close or too far to be recognizable. Additionally, in an instance in which a user manually adjusts a view range by selecting a setting or the like such manual adjustment may override the CIL module's adjustment of the view range.

As such, when the CIL module 78 determines that the density of items of virtual information is high (e.g., exceeds the predetermined threshold) based on corresponding real world objects captured by the camera module 36, the CIL module 78 may decrease the view distance of the camera module 36. Decreasing the view distance of the camera module 36 may allow the user to focus on virtual information associated with real world objects that are closer in proximity to the user. In contrast, when the CIL module 78 determines that the density of items of virtual information is low (e.g., below the predetermined threshold) based on corresponding real world objects captured by the camera module, the CIL module 78 may increase the view distance of the camera module 36. Increasing the view distance of the camera module 36 may allow the user to focus on virtual information associated with real world objects that are further away from the user.

The CIL module 78 may retrieve (or request) virtual or augmented reality information (also referred to herein as AR information) that is stored in an AR repository 84 that correlates to both the current location and the orientation information. The AR information may relate to one or more points of interest. The AR information may include, but is not limited to, geocoded information corresponding to location information (e.g., longitude, latitude and/or altitude coordinates) of real world objects (e.g., building, landmarks, etc.) and may include one or more information layers. The real world objects may be associated with objects in a current location of the apparatus 50 shown in a camera view of the camera module 36 or display 85. The AR information may also include geocoded information that contains or is associated with data such as, text, audio, images, pictures, photographs, video data, or any other suitable data. The information layers may be associated with one or more virtual objects (e.g., icons, pictograms, images, or the like). The information layers may also correspond to information, content, data or the like that may, but need not, be provided by one or more content providers (e.g., service providers such as, for e.g., Wikipedia™, Twitter™, etc.). The AR repository 84 may be a portion of the memory device 76 or may be an external memory or database. Alternatively, the AR repository 84 may be collocated with the CIL module 78.

In one embodiment, The CIL module 78 may select AR information from the AR repository 84 after receipt of the location information and the orientation information. In one embodiment, some AR information may be pre-fetched based on location information, perhaps before orientation information is known or before specific AR information is requested. The pre-fetched AR information may be received from a remote source and stored locally so that computation resource consumption may be reduced when searching for specific AR information to match the current location and orientation information when it is time to retrieve AR information since a smaller set of AR information may need to be dealt with during the search operation.

Referring now to FIG. 5, a diagram illustrating points of interest corresponding to real world objects that may be captured by the camera module at various view angles is provided. It should be pointed out that the orientation module 71 may determine the view angles of the camera module 36 in the manner described above. In the example embodiment of FIG. 5, the points of interest may be denoted by the dots such as, for example, dot 11. The points of interest and their corresponding data may retrieved by the CIL module 78 from the AR repository 84. As shown in FIG. 5, at some view angles there may be a lot of virtual information corresponding to points of interest and if all of this information is provided to the display 85, it may clutter the display and the user may have too much information to view anything useful. Instead of showing all the virtual information on the camera view of the display 85, the CIL module 78 may analyze the amount of data which is present at the angle the camera module 36 is viewing. In this regard, the CIL module 78 may automatically set or adjust the view distance of the camera module 36 to a distance which may enable provision of the amount of virtual information provided to the display 85 at a constant level. In the example embodiment of FIG. 5, the CIL module may adjust the view distance 9 of the camera module 36 at various angles based on the density or amount of points of interest that the CIL module identifies for a given angle(s). In this regard, the CIL module may enable provision of display of all of the points of interest inside the view distance 9 when the camera module 36 is pointed at the corresponding view angle(s) (e.g., 60°). On the other hand, the CIL module 78 may not enable provision of display of the points of interest outside of the view distance 9 of the camera module 36. In this regard, the user may be unable to view the points of interest that are outside of the view distance 9 of the camera module when the camera module 36 is pointed at corresponding view angles.

As an example, presume that the apparatus 50 is located at a position corresponding to the center of the circle 17. When the user of the apparatus 50 points the camera module 36 at real world objects at a view angle of 60°, the CIL module 78 may determine that there is a high density of points of interest in a current view range that is closer to the apparatus 50 than other view ranges. As such, the CIL module 78 may decrease the view distance of the camera module 36 at the view of angle 60° to enable provision of display of points of interest closer to the apparatus 50. In this regard, the user may be able to focus on points of interest that are closer to the user. In this example, the CIL module 78 may not enable provision of display of the points of interest outside of the adjusted view distance 9 at the view angle of 60°.

On the other hand, when the user of the apparatus 50 points the camera module 36 at a view angle of 300°, for example, the CIL module 78 may determine that there is a low density of information in a current view range and may adjust the view distance 9 of the camera module 36 at the view angle of 300° by increasing the view distance to enable provision of display of points of interest farther away from the apparatus 50. In this regard, the user of the apparatus 50 may focus on points of interest that are farther away from the user. In the example embodiment of FIG. 5, the CIL module 78 may enable provision of display of substantially all of the points of interest corresponding to the view angle of 300° based on the adjusted view distance 9 when the camera module is pointed at real world objects at the view angle of 300°. It should be pointed out that when the CIL module 78 enables provision of the display of the points of interest, virtual information associated with the corresponding real world object(s) may be overlaid on the respective real world objects based on correspondence between the geo-coordinates of the points of interest and the real world objects.

In an alternative example embodiment, the calculation of the view distance of the camera module 36 by the CIL module 78 may optionally not be set to a fixed amount of points of interest for display. Instead, the calculation, by the CIL module 78, of the view distance may vary depending on the size of information (e.g., size of virtual objects) associated with the points of interest. For example, the calculation of the view distance by the CIL module 78 may vary depending on the size of information layers that may be enabled for the provision of virtual information.

In this regard, in instances in which the CIL module 78 determines that the points of interest for an information layer(s) (e.g., information layer 3) qualifies as having a graphical size that is large based on comparison to a threshold value, the CIL module 78 may reduce the amount/quantity of points of interest that may be provided to the camera view of the display 85. On the other hand, in instances in which the CIL module 78 determines that the points of interest for an information layer(s) (e.g., information layer 7) qualifies as having a small graphical size based on a comparison to a different threshold value, the CIL module 78 may enable provision of one or more additional points of interest to be shown on the camera view of the display 85. In this alternative example embodiment, the points of interest may be provided to the display 85 at a constant level based in part on maintaining an overall total size requirement for the respective points of interest that may be shown on the display 85. As such, the CIL module 78 may account for the different sizes of the points of interest when enabling provision of the points of interest to the display 85.

In an alternative example embodiment, the calculation of the view distance of the camera module 36, by the CIL module 78, may be based in part on the type of information layer(s) that is enabled. For example, the calculation of the view distance by the CIL module 78 may vary, in part, depending on the type of information layers that may be enabled for the provision of virtual information. In this alternative example embodiment, predefined thresholds for display of one or more points of interest associated with corresponding information layers may be analyzed by the CIL module 78 to enable provision of display of points of interest. For purposes of illustration and not of limitation, consider an example in which an information layer (e.g., Wikipedia™ information layer 7) for providing points of interest associated with articles corresponding to encyclopedic data may be set to a predefined threshold of points of interest (e.g., 20 points of interest). Additionally, another information layer (e.g., Twitter™ information layer 3) for providing points of interest associated with social networking media, for example, may be set to another predefined threshold of points of interest (e.g., 15 points on interest). When the information layers for provision of encyclopedic data and social networking media are enabled, the CIL module 78 may alter or adjust the view distance of the camera module 36 to enable provision of a total number of points of interest corresponding to the predefined threshold for the encyclopedic data and the predefined threshold for the social networking media. In this regard, the CIL module 78 may combine the number of points of interest associated with the predefined thresholds for each of the enabled information layers and enable provision of display of these points of interest on the camera view of the display 85.

For instance, when the predefined threshold for the information layer providing the encyclopedic data is set as 20 points of interest and the predefined threshold for the information layer providing the social networking media is set as 15 points of interest, the CIL module 78 may adjust the view distance of the camera module such that a total of 35 points of interest are provided to display 85. In this example, 20 points of interest corresponding to the encyclopedic data and 15 points of interest corresponding to the social networking media may be provided to the camera view of the display 85. In the example above, it should be pointed out that in instances in which the CIL module 78 determines that there are fewer points of interest (e.g., 10 points of interest) available for an enabled information layer(s) than the corresponding predefined threshold (e.g., 20 points of interest), the CIL module 78 may enable provision for display of the maximum number of points of interest (e.g., 10 points of interest) identified for the enabled information layer(s) (e.g., Wikipedia™ information layer 7).

The information layers may be enabled by the apparatus 50 upon selection of a feature or setting provided by the CIL module 78 for example. In this regard, the user may utilize a pointing device or the like of the user interface 67 to select one or more information layers in order to enable the information layer(s). The information layers may be selected from a pull down menu(s), folder(s) or like provided by the CIL module 78. Additionally, the user may choose the predefined threshold for the points of interest to be provided by an information layer(s) based on the selection of a setting/feature. Alternatively, the predefined threshold(s) for the points of interest associated with information layers may be preset and preloaded on the apparatus 50.

In this example embodiment, the enabled information layers that are associated with respective predefined thresholds of points of interest may serve as a filtering mechanism to filter out, block or remove points of interest from display that are available for a current location that the user may not be interested in viewing. For example, there may be 100 points of interest associated with social networking media for a current location of the apparatus 50 or a current location of real world objects being shown by the camera view of the display. The user may be disinterested in this social networking media and by enabling the information layers associated with respective predefined thresholds of points of interest, the social networking media may be blocked by the CIL module 78 so that the social networking media is not provided to the display 85. The enabling of information layers may cause other information layers (e.g., a social networking media information layer) to be blocked since the other information layers may not be active.

Additionally, in an embodiment in which points of interest for all the information layers available for a current location are associated with a single threshold (e.g., 30 points of interest), the display 85 may also be provided with points of interest (e.g., 30 Twitter™ points of interest) that are of little or no interest to the user As such, it may be beneficial to allow the user to the select information layers (associated with respective thresholds) that the user is interested in obtaining information about so as to filter out, block or remove the display of undesirable information.

The CIL module 78 may operate in an offline mode and in an online mode. In the offline mode, the apparatus 50 may not have a connection with network 30 in which to access points of interest and associated data from a remote source such as for example a network device (e.g., a server (e.g., second communication device 20)). In this regard, the CIL module 78 may obtain information associated with one or more points of interest from the AR repository 84. The information associated with the information layers and the points of interest may be preloaded in the AR repository of the memory device 76. Additionally, the information associated with the information layers and the points of interest may be downloaded by another device (e.g., personal computer) via the network 30 and may be transferred (e.g., via a USB memory device) to the apparatus 50 and stored in the memory device 76.

In the online mode, the apparatus 50 may be able to communicate via the network 30 with one or more devices (e.g., second and third communication devices 20 and 25) and obtain information associated with one or more information layers and points of interest. For example, as shown in FIG. 6, the apparatus 50 may be able to communicate with a designated network device 108 (e.g., a server (e.g., second communication device 20)) for receipt of information associated with one or more information layers and/or corresponding points of interest. In this regard, the CIL module 78 may send a query to the network device 108 requesting information associated with one or more information layers and corresponding points of interest. The query may include location information provided by the positioning sensor 72 to identify a current location of the apparatus 50 or a location of real world objects shown in the camera view of the display 85.

In response to receipt of the query, the network device 108 may analyze one of its memories (e.g., memory 96 of FIG. 7) to determine whether it has any information associated with information layers and corresponding points of interest that corresponds to the location information provided by the CIL module 78. When the network device 108 determines that it has information pertaining to information layers and corresponding points of interest associated with the location information, the network device 108 may send this information to the CIL module 78. The CIL module 78 may then utilize the received information to automatically adjust the view distance of the camera module 36 so that the points of interest may be provided to the display 85, in the manner described above.

On the other hand, when the network device 108 determines that it does not have any information relevant to the location information provided in the query, the network device 108 may send a query with the location information to one or more other network devices 110, 112 (e.g., third communication device 25). The query sent by the network device 108 may also include a request for information associated with the information layers and corresponding points of interest that is desired by the CIL module 78. In response to receipt of the information layer(s) and points of interest from one or more of the network devices 110, 112, the network device 108 may send the received information to the CIL module 78 which may use the information to automatically adjust the view distance of camera module 36 and provide points of interest to the display 85, in the manner described above.

A benefit of obtaining the information associated with the information layers and corresponding points of interest from one or more network devices is that the bandwidth used between the apparatus 50 and the respective network device(s) may be minimized to only send necessary information. For example, if the apparatus 50 communicates with the network devices 110, 112 directly for information relevant to information layers and corresponding points of interest, such communications may require a much larger bandwidth, since the apparatus may have to generate all of the queries to network devices 110, 112. The responses to queries from the network devices 110, 112 in many cases may contain a lot more information than required and all this information may have to be sent to the apparatus 50, before the apparatus 50 could filter the information and adjust the view distance of the camera module accordingly.

Referring now to FIG. 7, a block diagram of an example embodiment of a network entity, such as, for example, network devices 108, 110 and 112 of FIG. 6 are provided. As shown in FIG. 7, the network entity (e.g., a server) may include a processor 94 and a memory 96. The memory 96 may comprise volatile and/or non-volatile memory, and may store content, data and/or the like. The memory 96 may store client applications, instructions, and/or the like for the processor 94 to perform the various operations of the network entity. The memory 96 may be a tangible non-transitory device.

The processor 94 may also be connected to a communication interface 98 or other means for displaying, transmitting and/or receiving data, content, and/or the like. The user input interface 95 may comprise any of a number of devices allowing the network entity to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The network entity may receive one or more queries from a device (e.g., apparatus 50 or network device 108 in one embodiment) for information corresponding to information layers and corresponding points of interest. The queries may include location information indicating the current location of the apparatus 50 or location information associated with real world objects in a camera view of display 85. In response to retrieving relevant information from memory 96, the processor 94 may facilitate sending of the retrieved information to a network device which may send the information to the apparatus 50. Alternatively, the processor 94 may facilitate sending of the retrieved information directly to the apparatus 50, so that the CIL module 78 may use the information to automatically adjust the view distance of the camera module 36 based in part on the density or amount of points of interest received from the network entity. In this regard, the CIL module may enable provision of at least a portion of the points of interest to display 85, in the manner described above.

Referring now to FIG. 8, an example embodiment of a flowchart for providing a constant level of information in augmented reality is provided. At operation 800, apparatus 50 may include means, such as the CIL module 78, the processor 70 and/or the like, for determining a density or a first number of points of interest that are associated with one or more real world objects (e.g., a first set of real world objects) of a current location(s) that are currently being displayed. The current location may be a location of the apparatus 50 or corresponding locations of the real world objects in a real world environment. One or more images of the real world objects may be captured by a device (e.g., camera module 36) and may be displayed on a camera view of a display (e.g., display 85). The points of interest may be associated with one or more information layers (e.g., information layer 3). Items of virtual information (e.g., virtual objects) associated with the POIs may be overlaid, by the means, such as CIL module 78, the processor 70, and/or the like of apparatus 50, on corresponding real world objects provided to the camera view of the display.

At operation 805, the apparatus 50 may include means, such the CIL module, processor 70 and/or the like for comparing the density or first number of points of interest to a predetermined threshold (e.g., 30 points of interest). At operation 810, in response to determining that the first number of points of interest is below the predetermined threshold, the means, such as the CIL module, processor 70 and/or the like of apparatus 50 may increase a view distance (e.g., 500 meters) of a media capturing device (e.g., camera module 36) to enable display of one or more additional real world objects (e.g., a second set of real world objects) in order to increase the first number of POIs to a second number of POIs (e.g., 30 points of interest) that corresponds to the predetermined threshold (e.g., 30 points of interest). The CIL module may increase the first number of POIs to a second number of POIs in an instance in which the means, such as CIL module, processor 70 and/or the like of apparatus 50 determines that points of interest associated with the one or more real world objects (e.g., first set of real world objects) and the additional real world objects (e.g., second set of real world objects) equals the predetermined threshold (e.g., 30 points of interest).

At operation 815, in response to determining that the first number of points of interest is above the predetermined threshold, the means, such as CIL module 78, processor 70 and/or the like of apparatus 50 may decrease or reduce a view distance of a media capturing device (e.g., camera module 36) to enable removal of one or more of the real world objects from the display in order to decrease the first number of POIs to the second number of POIs that corresponds to the predetermined threshold. The apparatus 50 may include means, such as CIL module 78, processor 70 and or the like, for decreasing the first number of POIs to a second number of POIs in an instance in which the means, such as CIL module 78, processor 70 and/or the like of apparatus 50 determines that points of interest associated with the real world objects remaining on the display after the removal of at least a portion of the real world objects equals the predetermined threshold (e.g., 30 points of interest). It should be pointed out that the apparatus 50 may include means, such as CIL module 78, the processor 70 and or the like for removing at least a portion of the real world objects from the display.

It should be pointed out that FIG. 8 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, CIL module 78, processor 94). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 8 above may comprise a processor (e.g., the processor 70, CIL module 78, processor 94) configured to perform some or each of the operations (800-815) described above. The processor may, for example, be configured to perform the operations (800-815) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (800-815) may comprise, for example, the processor 70 (e.g., as means for performing any of the operations described above), the CIL module 78, the processor 94 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining a first number of points of interest associated with a first set of real world objects, of at least one current location, currently being displayed;
   determining, via a processor, whether the first number is below a predetermined threshold;
   increasing a view range of a device to facilitate display of a second set of real world objects in order to increase the first number to a second number of points of interest that is greater than or equal to the predetermined threshold in an instance in which the first number is below the threshold,
   wherein the view range comprises the view at a distance and angle of the device;
   facilitating provision of a plurality of information layers that relate in part to one or more items of virtual information corresponding to receipt of information indicative of the current location, wherein a first subset of the items of virtual information relate to at least the first set of objects and corresponds to a first information layer of the layers generated by a first content provider which creates the items of virtual information of the first subset;
   assigning the predetermined threshold to the first information layer,
   determining that a second subset of the items of virtual information relate to at least the first set of objects and corresponds to a second information layer of the layers generated by a second content provider which creates the items of virtual information of the second subset;
   assigning a predefined threshold to the second information layer; and
   facilitating display of a second quantity of points of interest associated with the first set of objects in an instance in which the second quantity is maintained equal to a value of the predefined threshold.

2. The method of claim 1, further comprising:
   decreasing the view range of the device to facilitate removal of at least one object of the first set from being displayed to facilitate display of the second number of points of interest that equals the predetermined threshold in an instance in which the first number is above the threshold.

3. The method of claim 2, wherein decreasing the first number to the second number of points of interest comprises determining that a quantity of points of interest remaining displayed after removal of at least a portion of the real world objects of the first set from the display equals the predetermined threshold.

4. The method of claim 1, further comprising:
determining that the view range comprises a distance from the device to a point in a real world environment for capturing one or more images of the objects being displayed.

5. The method of claim 1, wherein increasing the first number to the second number of points of interest comprises determining that a quantity of points of interest associated with the first set and the second set of objects equals the predetermined threshold.

6. The method of claim 1, further comprising:
facilitating display of a first quantity of points of interest associated with the first set of objects in an instance in which the quantity is maintained equal to a value of the predetermined threshold.

7. The method of claim 1, wherein:
the predetermined threshold and the predefined threshold comprise different values.

8. The method of claim 1, further comprising:
comparing a size of at least one point of interest corresponding to a respective one of the real world objects of the first set; and
increasing or decreasing at least the first number of points of interest based on the comparison of the size to a predefined threshold.

9. An apparatus comprising:
at least one processor; and
at least one memory including computer program code, the at least one memory and the computer program code configured to, with the at least one processor, cause the apparatus to perform at least the following:
determine a first number of points of interest associated with a first set of real world objects, of at least one current location, currently being displayed;
determine whether the first number is below a predetermined threshold;
increase a view range of a device to facilitate display of a second set of real world objects in order to increase the first number to a second number of points of interest that is greater than or equal to the predetermined threshold in an instance in which the first number is below the threshold,
wherein the view range comprises the view at a distance and angle of the device;
facilitate provision of a plurality of information layers that relate in part to one or more items of virtual information corresponding to receipt of information indicative of the current location, wherein a first subset of the items of virtual information relate to at least the first set of objects and corresponds to a first information layer of the layers generated by a first content provider which creates the items of virtual information of the first subset;
assign the predetermined threshold to the first information layer;
determine that a second subset of the items of virtual information relate to at least the first set of objects and corresponds to a second information layer of the layers generated by a second content provider which creates the items of virtual information of the second subset;
assign a predefined threshold to the second information layer; and
facilitate display of a second quantity of points of interest associated with the first set of objects in an instance in which the second quantity is maintained equal to a value of the predefined threshold.

10. The apparatus of claim 9, wherein the at least one memory and the computer program code are further configured to, with the processor, cause the apparatus to:
decrease the view range of the device to facilitate removal of at least one object of the first set from being displayed to facilitate display of the second number of points of interest that equals the predetermined threshold in an instance in which the first number is above the threshold.

11. The apparatus of claim 10, wherein the at least one memory and the computer program code are further configured to, with the processor, cause the apparatus to decrease the first number to the second number of points of interest by determining that a quantity of points of interest remaining displayed after removal of at least a portion of the real world objects of the first set from the display equals the predetermined threshold.

12. The apparatus of claim 9, wherein the at least one memory and the computer program code are further configured to, with the processor, cause the apparatus to:
determine that the view range comprises a distance from the device to a point in a real world environment for capturing one or more images of the objects being displayed.

13. The apparatus of claim 9, wherein the at least one memory and the computer program code are further configured to, with the processor, cause the apparatus to increase the first number to the second number of points of interest by determining that a quantity of points of interest associated with the first set and the second set of objects equals the predetermined threshold.

14. The apparatus of claim 9, wherein the at least one memory and the computer program code are further configured to, with the processor, cause the apparatus to:
facilitate display of a first quantity of points of interest associated with the first set of objects in an instance in which the quantity is maintained equal to a value of the predetermined threshold.

15. The apparatus of claim 9, wherein the predetermined threshold and the predefined threshold comprise different values.

16. The apparatus of claim 9, wherein the at least one memory and the computer program code are further configured to, with the processor, cause the apparatus to:
compare a size of at least one point of interest corresponding to a respective one of the real world objects of the first set; and
increase or decrease at least the first number of points of interest based on the comparison of the size to a predefined threshold.

17. A computer program product comprising at least one non-transitory computer-readable storage medium having computer-executable program code instructions stored therein, the computer-executable program code instructions comprising:
program code instructions for determining a first number of points of interest associated with a first set of real world objects, of at least one current location, currently being displayed;
program code instructions for determining whether the first number is below a predetermined threshold;
program code instructions for facilitating increase of a view range of a device to facilitate display of a second set of real world objects in order to increase the first number to a second number of points of interest that is greater than or equal to the predetermined threshold in an instance in which the first number is below the threshold, wherein the view range comprises the view at a distance and angle of the device;

program code instructions for facilitating provision of a plurality of information layers that relate in part to one or more items of virtual information corresponding to receipt of information indicative of the current location, wherein a first subset of the items of virtual information relate to at least the first set of objects and corresponds to a first information layer of the layers generated by a first content provider which creates the items of virtual information of the first subset;

program code instructions for assigning the predetermined threshold to the first information layer;

program code instructions for determining that a second subset of the items of virtual information relate to at least the first set of objects and corresponds to a second information layer of the layers generated by a second content provider which creates the items of virtual information of the second subset;

program code instructions for assigning a predefined threshold to the second information layer; and program code instructions for facilitating display of a second quantity of points of interest associated with the first set of objects in an instance in which the second quantity is maintained equal to a value of the predefined threshold.

18. The computer program product of claim 17, further comprising:

program code instructions for decreasing the view range of the device to facilitate removal of at least one object of the first set from being displayed to facilitate display of the second number of points of interest that equals the predetermined threshold in an instance in which the first number is above the threshold.

19. The computer program product of claim 17, further comprising:

program code instructions for determining that the view range comprises a distance from the device to a point in a real world environment for capturing one or more images of the objects being displayed.

20. The computer program product of claim 17, wherein facilitating increase of the first number to the second number of points of interest comprises determining that a quantity of points of interest associated with the first set and the second set of objects equals the predetermined threshold.

* * * * *